(12) United States Patent
Sainio

(10) Patent No.: US 8,624,409 B2
(45) Date of Patent: Jan. 7, 2014

(54) SHOCK ABSORBER ELECTRICAL GENERATOR

(76) Inventor: John R. Sainio, Ramsey, MN (US)

(*) Notice: Subject to any disclaimer, the term of this patent is extended or adjusted under 35 U.S.C. 154(b) by 321 days.

(21) Appl. No.: 13/008,768

(22) Filed: Jan. 18, 2011

(65) Prior Publication Data

US 2011/0266801 A1    Nov. 3, 2011

Related U.S. Application Data

(60) Provisional application No. 61/282,952, filed on Apr. 28, 2010.

(51) Int. Cl.
*H02K 7/065* (2006.01)
(52) U.S. Cl.
USPC .............................. 290/1 R; 290/47; 290/48
(58) Field of Classification Search
USPC ..................................................... 290/47, 48
See application file for complete search history.

(56) References Cited

U.S. PATENT DOCUMENTS

| | | | |
|---|---|---|---|
| 5,347,186 A | 9/1994 | Konotchick | |
| 6,220,719 B1 | 4/2001 | Vetorino et al. | |
| 7,148,583 B1 | 12/2006 | Shau et al. | |
| 7,332,826 B2 | 2/2008 | Terzian et al. | |
| 7,476,989 B2 | 1/2009 | Hsu et al. | |
| 7,498,682 B2 | 3/2009 | Lemieux | |
| 7,541,684 B1 | 6/2009 | Valentino | |
| 2007/0074752 A1 | 4/2007 | Shau et al. | |
| 2007/0145750 A1 | 6/2007 | Terzian et al. | |
| 2009/0260935 A1 | 10/2009 | Avadhany et al. | |

*Primary Examiner* — Tulsidas C Patel
*Assistant Examiner* — Sean Gugger
(74) *Attorney, Agent, or Firm* — Richard C. Litman

(57) ABSTRACT

The shock absorber electrical generator includes a piston adapted for reciprocating motion within a cylindrical piston chamber as a vehicle's suspension system deflects. A working fluid is contained within the piston chamber. During the compression stroke of the piston, working fluid is forced through a circuit having at least one chamber in the cylinder opposite the piston. The working fluid communicates with at least one fan turbine motor disposed in the chamber, and with the piston chamber, which captures the working fluid on the return stroke. Upon compression of the piston, the working fluid passes through the fan turbine motor, thereby turning a shaft connected to a DC generator. The electric energy generated is routed to vehicle electrical components and/or charges the vehicle battery. Multi-generator systems, fan, and housing units are deployed in a plurality of shock absorber electrical generators that are attached to the vehicle's wheel system.

12 Claims, 13 Drawing Sheets

SHOCK ABSORBER ELECTRICAL GENERATOR

CROSS-REFERENCE TO RELATED APPLICATION

This application claims the benefit of U.S. Provisional Patent Application Ser. No. 61/282,952, filed Apr. 28, 2010.

BACKGROUND OF THE INVENTION

1. Field of the Invention

The present invention relates generally to devices for generating electricity in a motor vehicle, and shock absorber electrical generator for converting motion of the motor vehicle into electrical power.

2. Description of the Related Art

Rising fossil fuel costs, increased environmental concerns, environmental regulations, and the like are driving the need for a variety of novel energy conserving and generating technologies. For example, new, highly efficient electric, hybrid, and fuel-efficient gas vehicles having improved electric batteries are coming to market.

Shock impact forces from road surface irregularities, vibration forces from unbalanced vehicle wheels, sudden accelerating, and vehicle braking forces are normally absorbed and damped by the shock absorbers of these vehicles. Vehicle size, body weight and desired level of riding comfort are factors that affect the selection of shock absorber type and design. A shock absorber dampens the oscillations of vehicle suspension spring components, the spring components producing mechanical work as they absorb road shocks.

In many cars, the shock absorber is combined with a spring in a unit known as the frame strut. The shock absorber restricts displacement and oscillation frequency of the spring thereby assisting in keeping the vehicle body (and its occupants) from bouncing dramatically. Shock absorber design and capacity are tailored to the load, type of vehicle, road conditions, and type of driving. Some shock absorbers are comprised of an incompressible liquid working fluid to dampen the shocks, whilst other shock absorbers (gas shock absorbers) are comprised of a compressible gaseous working fluid to dampen the shocks. Gas shock absorbers are preferable in the aforementioned modern vehicles because of their ease of use in such vehicles that also have active suspension control features. To further obviate the impact of rising fuel costs, and the like, it would be desirable to capture a portion of the work done by these gas shock absorbers as they smooth out the ride of the aforementioned new highly efficient vehicles which are coming to market.

Thus, a shock absorber electrical generator solving the aforementioned problems is desired.

SUMMARY OF THE INVENTION

The shock absorber electrical generator includes a piston disposed for reciprocating motion within a cylinder as a vehicle's suspension system deflects. A substantially gaseous working fluid is contained within the cylinder. During the compression stroke of the piston, the working fluid is forced through a working fluid circuit through at least one chamber in the cylinder opposite the piston. This working fluid is in fluid communication with a fan turbine motor disposed in the chamber and in fluid communication with the piston chamber, the chamber capturing the working fluid on the return stroke. Upon compression due to the piston, the working fluid passes through the fan turbine motor, thereby turning a shaft connected to a DC generator.

The electric energy generated by the generator may be used by the vehicle as it is generated, or stored in, for example, the vehicle's battery. Preferably, the harvested electricity is used to power components on a vehicle that would otherwise strain the internal combustion engine, thereby increasing fuel efficiency.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
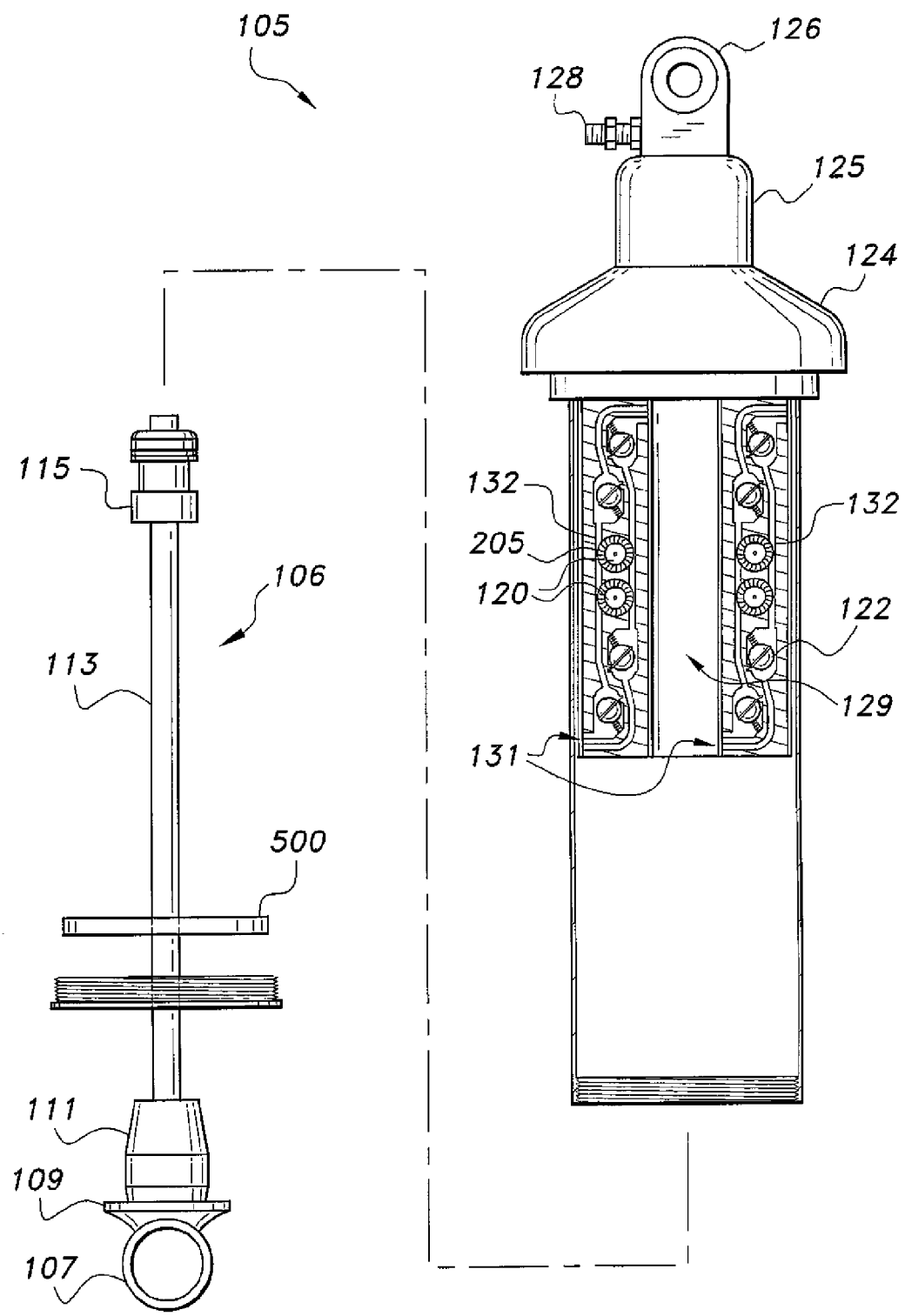
FIG. 1 is a partially exploded view of the shock absorber electrical generator according to the present invention.
Figure 2:
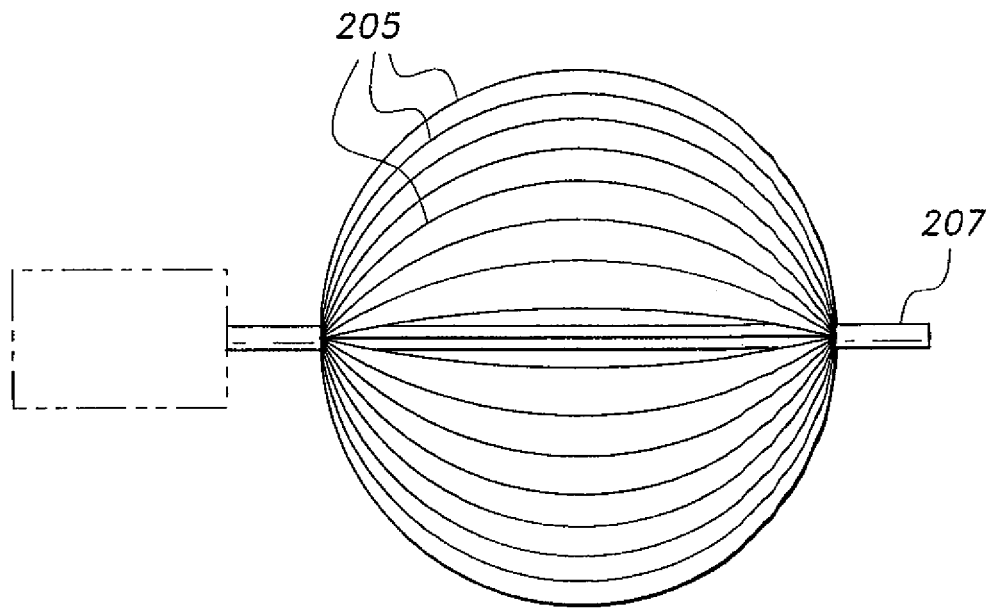
FIG. 2 is a plan view of a spherical fan assembly of the shock absorber electrical generator according to the present invention.
Figure 11:
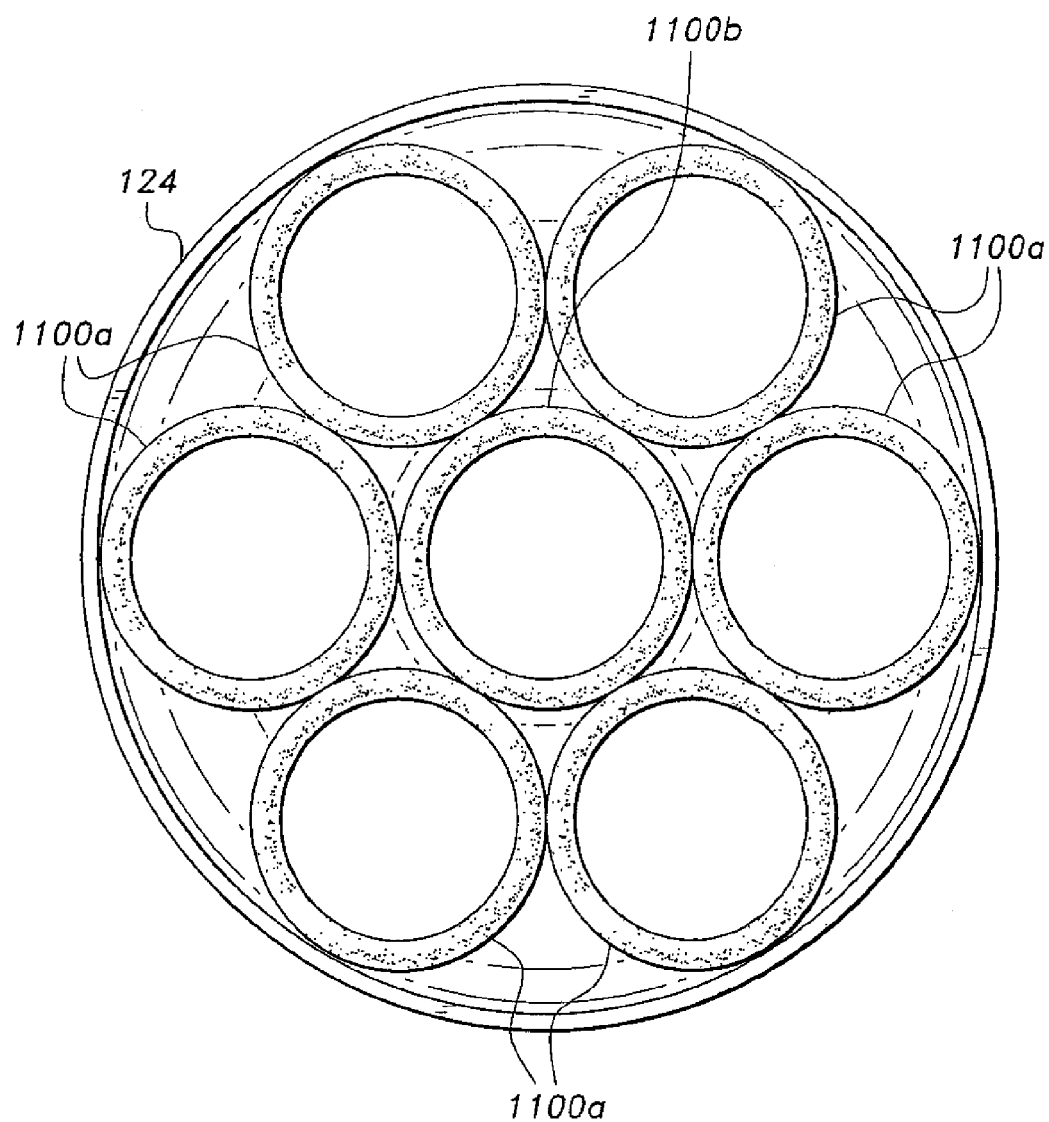
FIG. 11 is a bottom view of a cap unit for a shock absorber electrical generator according to the present invention.

As shown in FIG. 1, the shock absorber electrical generator 105 includes a substantially cylindrical, hollow shock absorber body 106. A first end of the shock absorber body 106 extends into a hollow cap unit having a bottom portion 124, a cylindrically elongate middle portion 125 and a suspension attachment mount 126 adapted for attachment to suspension and/or wheel components of a vehicle. As shown in FIG. 11, the bottom of the cap unit has a plurality of tube ring seals 1100a and a singular central tube ring seal 1100b to prevent the nitrogen filled shock absorber body 106 from leaking nitrogen back into the environment.

A nitrogen fill valve 128 extends at a substantially perpendicular angle from the attachment mount 126. A second end of shock absorber body 106 is adapted for receiving a piston assembly. The piston assembly is comprised of an elongate rod 113 having a first end extending into a piston 115 and a second end extending into a piston-suspension attachment mount 109 having an eyelet and bushing 107 adapted for attachment to a vehicle's suspension/wheel components.

Figure 5:
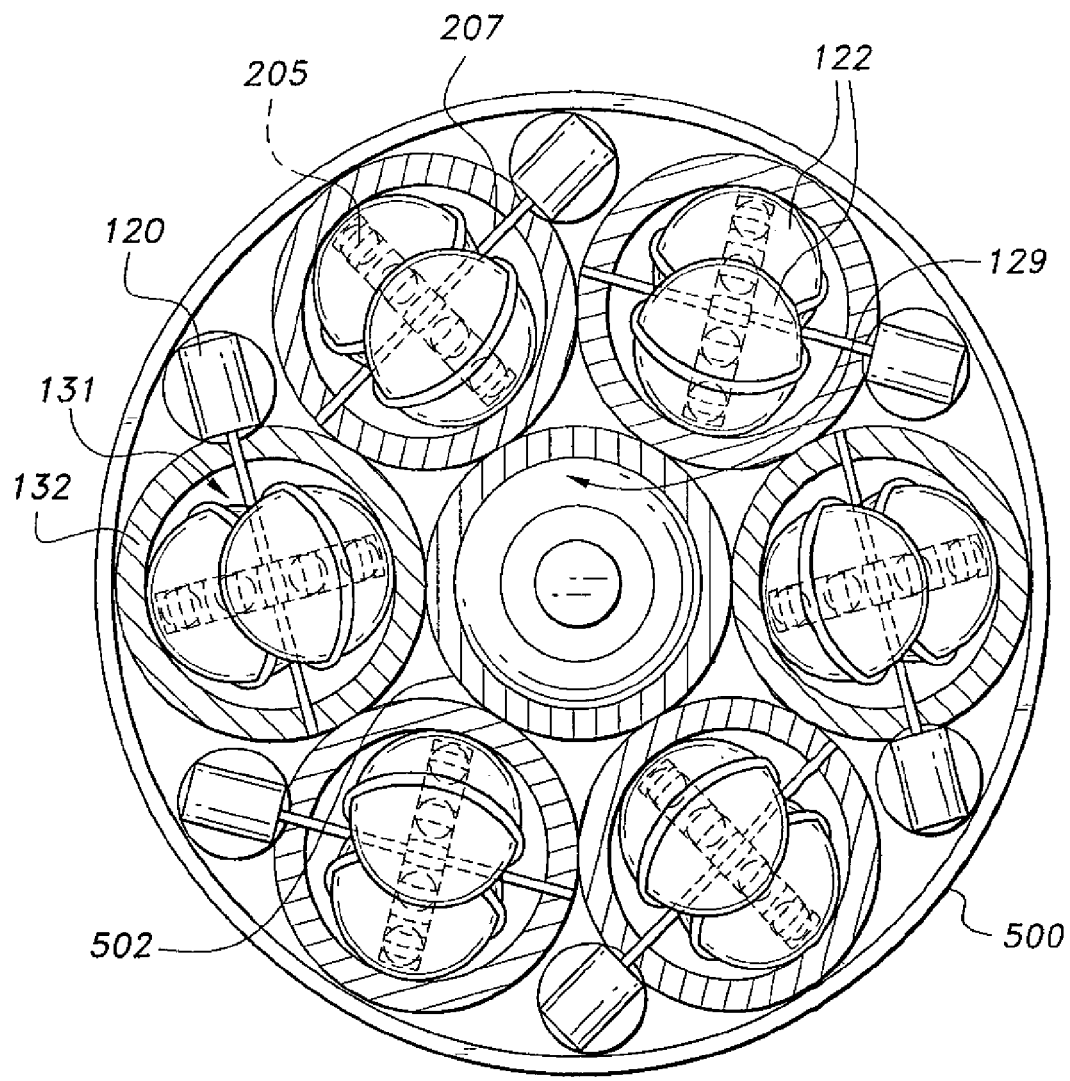
FIG. 5 is a top view in section showing the internal tube configuration of the shock absorber electrical generator according to the present invention.

Travel limiter 111 limits the displacement of the piston assembly as it slides up and down inside the shock absorber body 106. A central tube 502 forms a piston chamber 129 that extends downward from the first end of hollow body 106 towards the second end of hollow body 106. Auxiliary piston 500 is coaxially attached to the rod 113 and displaces working gas, preferably a nitrogen-CO2 mix, within a lower portion of the interior of the shock absorber body 106. The working medium within shock absorber 105 may also include a small amount of liquid oil which flows through the system to cool, lubricate, and dampen noise of internal moving parts of the assembly. The piston assembly including the piston 115 and a portion of rod 113 is slidably disposed within the central tube 502, as seen in FIG. 5. The body 106, including the piston assembly is hermetically sealed thereby allowing the internal portion of the body 106 to accept and retain a high pressure gaseous working medium introduced into the body 106 via nitrogen fill valve 128.

Figure 6:
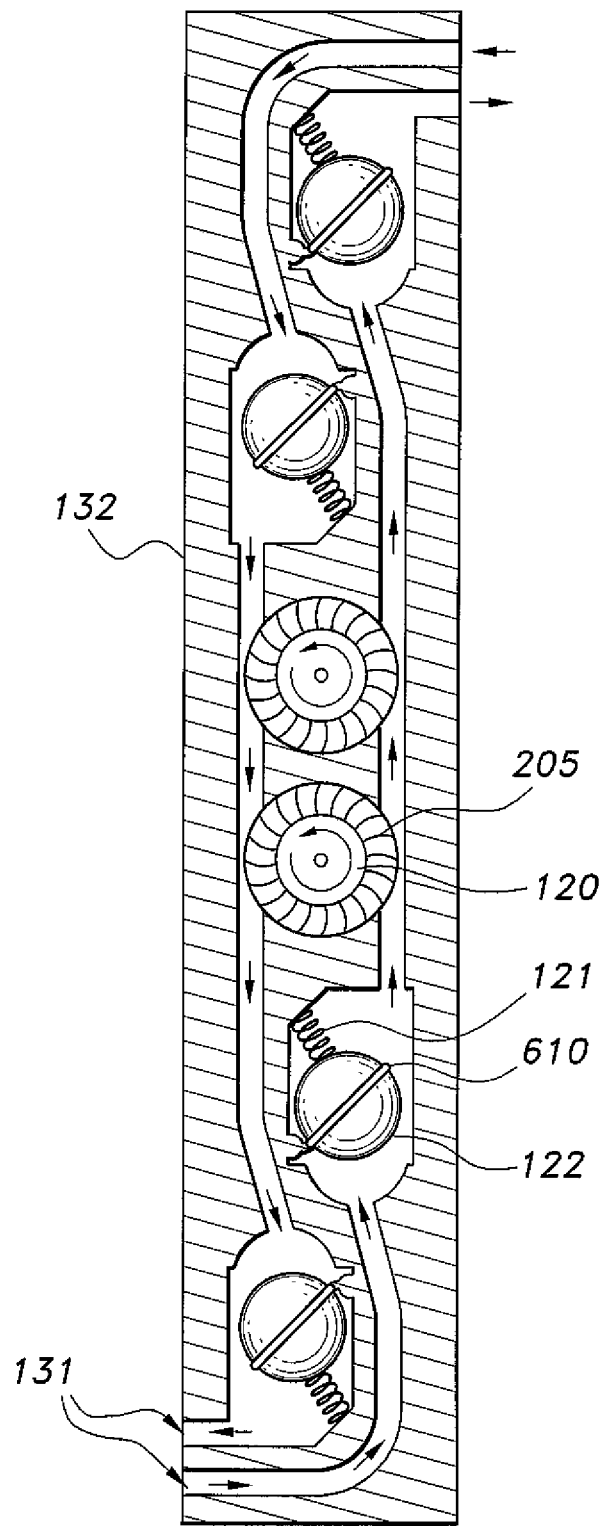
FIG. 6 is a section view of the fan chamber wall in a shock absorber electrical generator according to the present invention.

Extending longitudinally alongside the central tube 502 are undulating, power transfer tubes 132, which form power transfer chambers 131. A plurality of one-way valves 122 is disposed in the transfer chambers 131 within the power transfer tubes 132. The configuration of the transfer chambers 131 in relation to the central tube 502 is most clearly shown in FIG. 5. The one-way valves 122 are spherical, and each has a seal ring 610 (most clearly shown in FIG. 6) that separates hemispherical portions of the valve 122 and seats against opposing lateral edges formed in the power transfer tubes 132 to prevent backflow of the gaseous working medium through the transfer chambers 131.

Figure 4A:
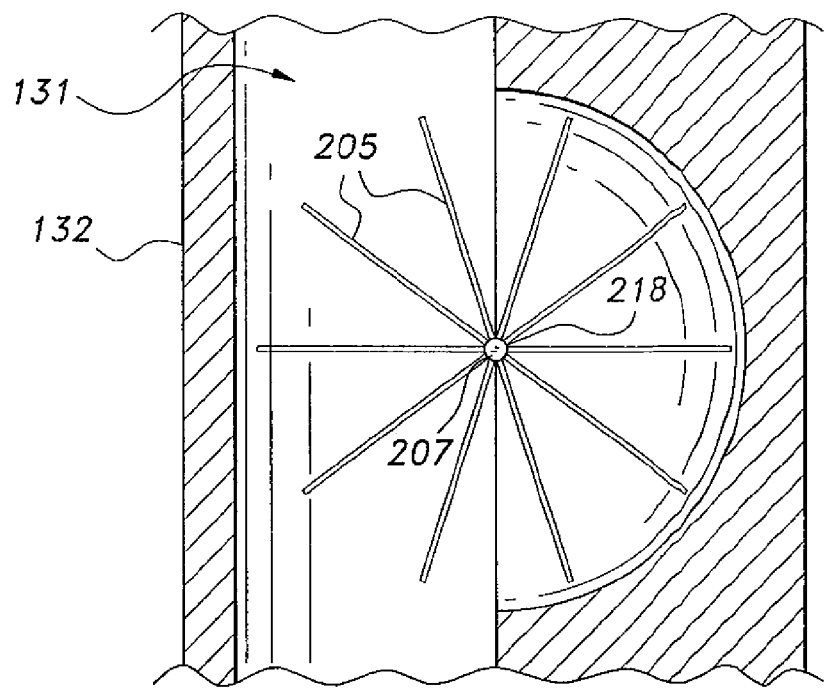
FIGS. 4A and 4B are partial side views of first and second embodiments of fan chambers for a shock absorber electrical generator according to the present invention.
Figure 4B:
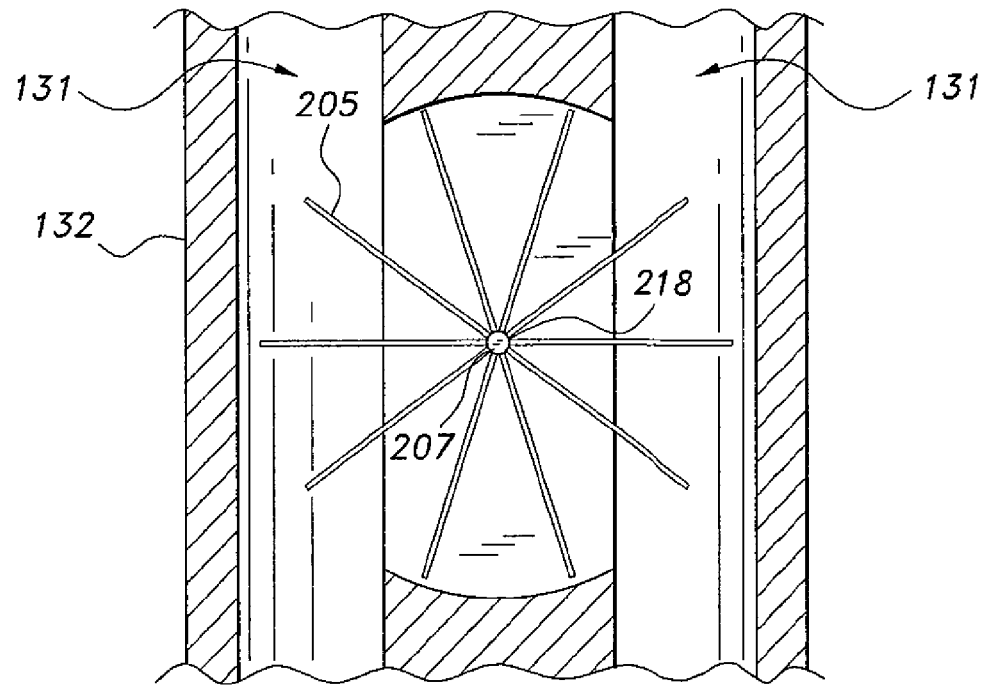

A spring 121 attaching the one-way valve 122 to the inside of power transfer tube 132 biases the valve 122 to a closed position inside of the power transfer chamber 131 until a blast of high pressure gas is forced through the chamber 131 by dual-stroke action of the auxiliary piston 500. Turbine fans 205 are attached to the power transfer tubes 132 via axles 207, thereby allowing the turbine fans 205 to freely spin when working gas impinges upon the fan blades. As shown in FIGS. 4A and 4B, the fan axles 207 are seated in axle-support bearing holes 218. A Direct Current (DC) generator motor 120 is coaxially attached to each turbine fan 205. During the compression stroke of the piston assembly, the auxiliary piston 500 forces compressed working gas into inlets of the chambers 131 formed by power transfer tubes 132. During the expansion stroke of the piston assembly, the auxiliary piston 500 sucks working gas out of opposing side outlets of the chambers 131. Thus, the inlets and outlets form a circuit adapted for one-way flow of nitrogen therethrough. Due to the arrangement of the one-way valves 122 inside of the chambers 131, both the compression stroke and the expansion stroke result in relative synchronous spinning of the fan assemblies 205, which causes the DC generators 120 to generate DC current, which can be routed out of the shock absorber 105 to electrical components of a vehicle using the shock absorber 105.

Figure 3:
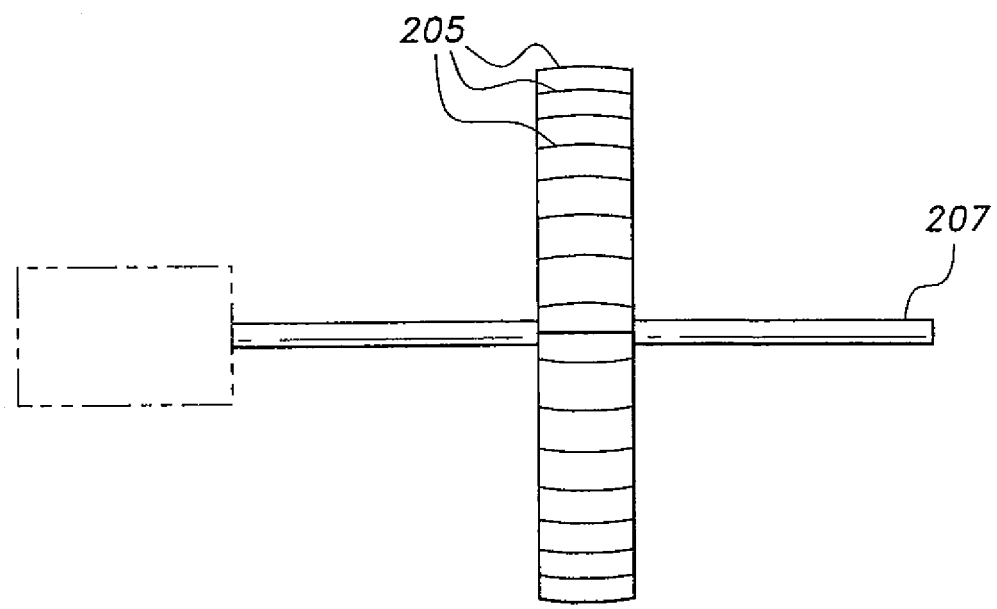
FIG. 3 is a plan view of a toroidal fan assembly of the shock absorber electrical generator according to the present invention.

As shown in FIGS. 2, 3, 4A, and 4B, the fans 205 may either be designed to have a spherical shape (FIG. 2) or a toroidal shape (FIG. 3). Alternative housings are provided in the power transfer tubes 132.

Figure 7:
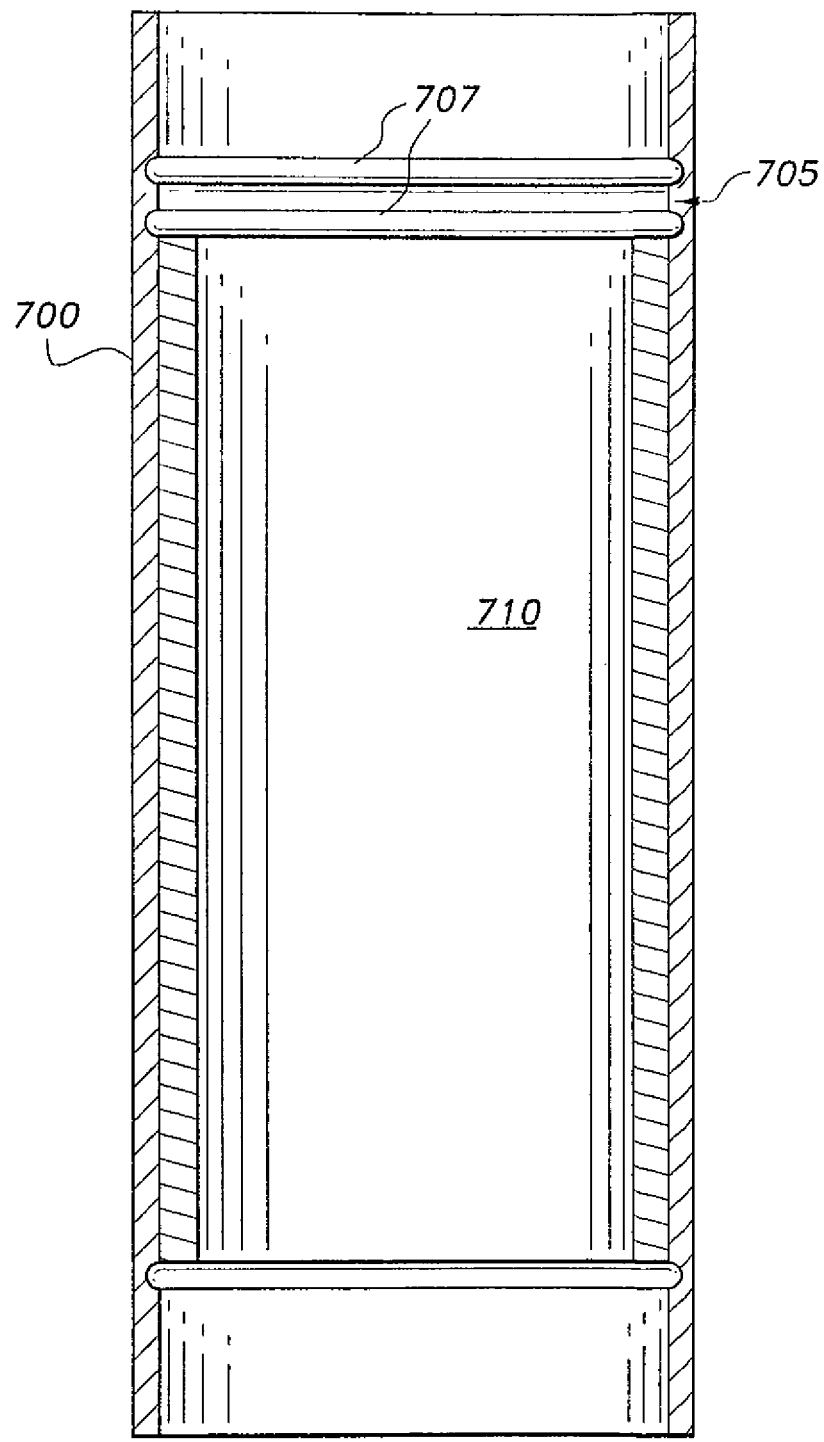
FIG. 7 is a side view in section of a motor housing and permanent magnet assembly for a shock absorber electrical generator according to the present invention.
Figure 8:
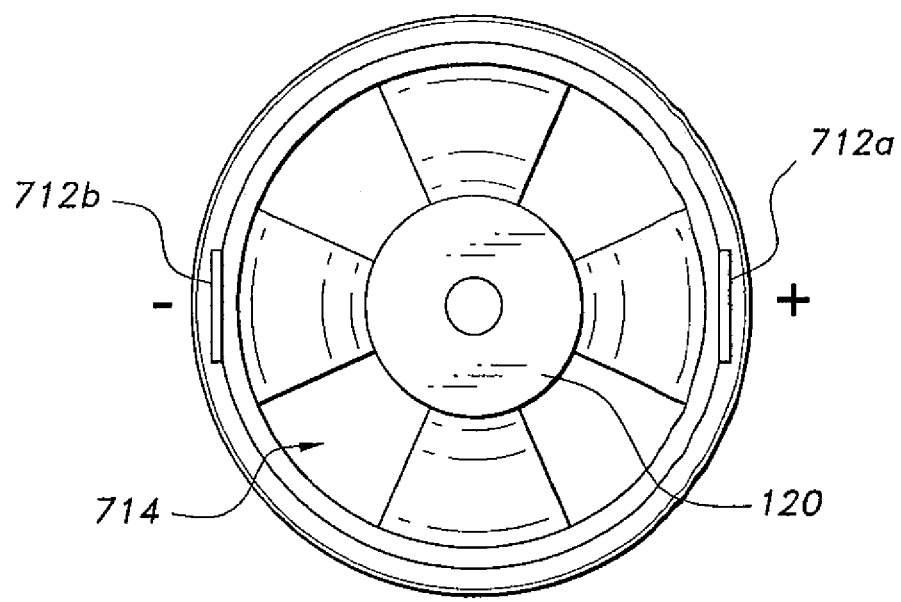
FIG. 8 is a top view of the rotor portion of a shock absorber electrical generator according to the present invention.
Figure 9:
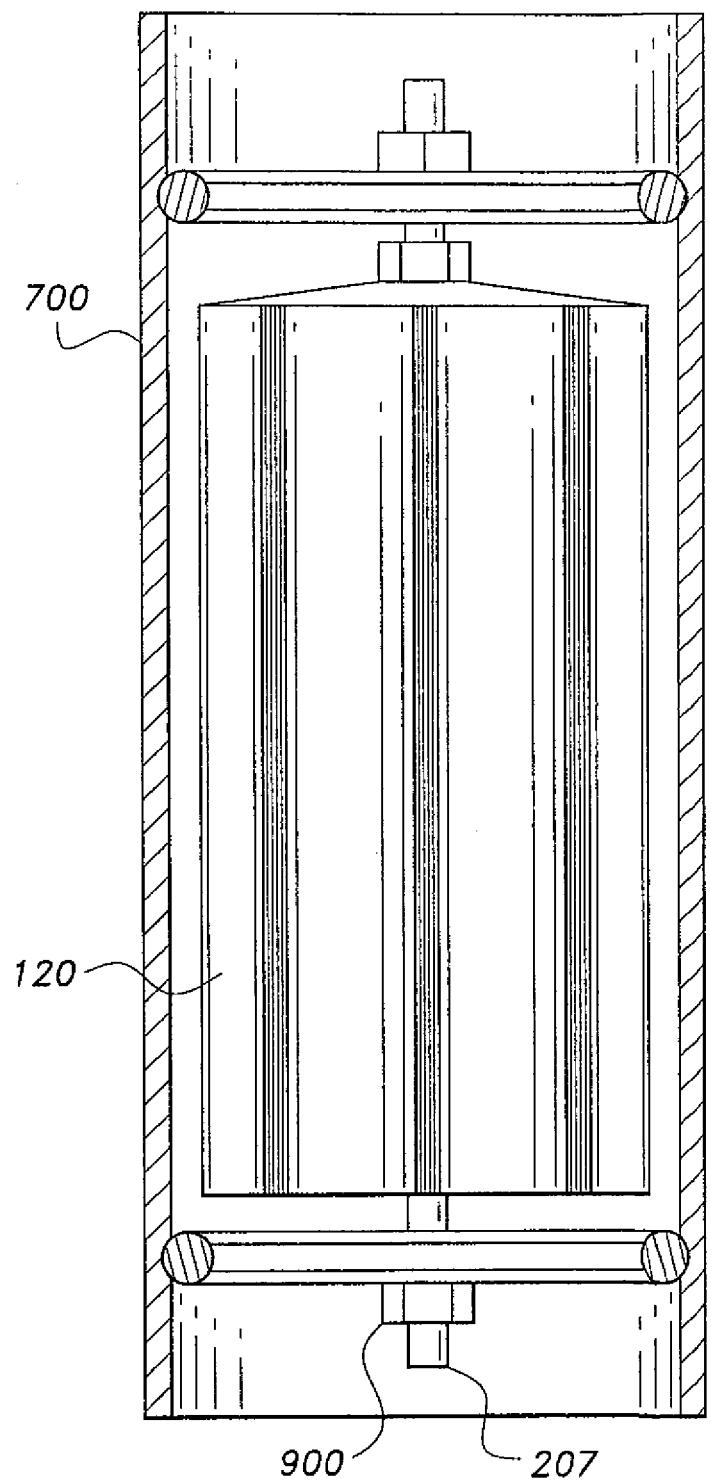
FIG. 9 is a top view in section of the generator housing assembly in a shock absorber electrical generator according to the present invention.
Figure 10:
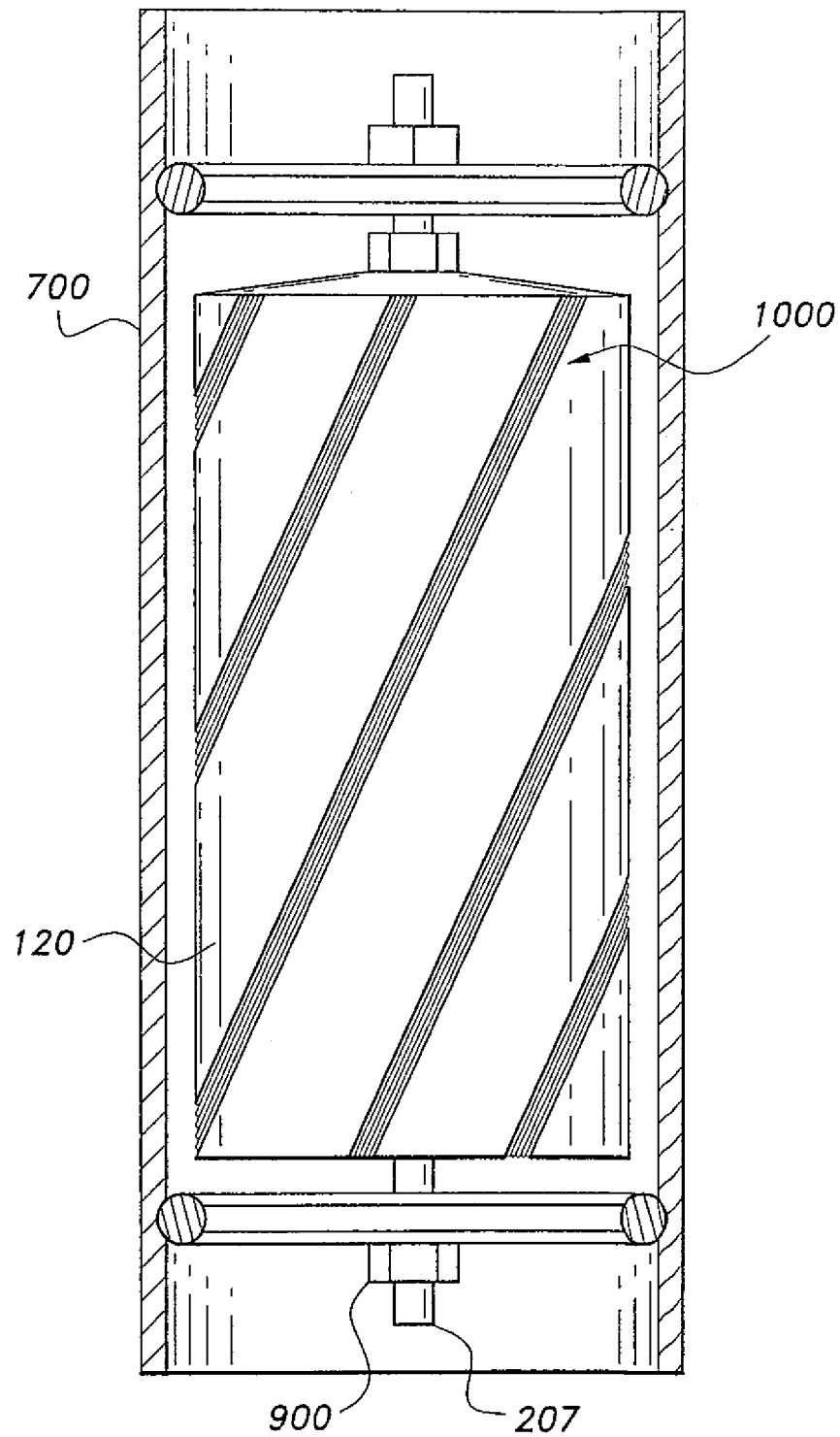
FIG. 10 is a top view in section of the generator housing assembly of a shock absorber electrical generator according to the present invention, showing the spiral coil loop.

As shown in FIG. 7, a motor-retaining assembly portion 700 of the power transfer tube 132 includes two longitudinally opposed sidewalls 707, which form snap ring groove 705, the snap ring groove 705 permitting the motor assembly to be snap fitted into the motor retaining assembly 700. A permanent magnet 710 is disposed in the floor of the motor-retaining assembly 700 and functions as a stator for the motor-electrical generator 120. As shown in FIG. 8, the motor 120 has positive and negative voltage connectors 712a and 712b, respectively. A plurality of air vents 714 is disposed concentrically around an inner peripheral circumference of coaxially disposed motor 120. As shown in FIG. 9, the rotor portion of the motor 120 fits along the length of motor-retaining stator portion 700, and is allowed to rotate securely via attachment of the axle 207 to a washer bearing 900. As shown in FIG. 10, the rotor has a plurality of preferably spiral grooves 1000 disposed around it in which enamel-coated copper wiring is coiled to form the wire loop responsible for electric generation when the rotor causes the wire loop to repetitively break the magnetic field formed by the stator magnet 710.

Figure 12:
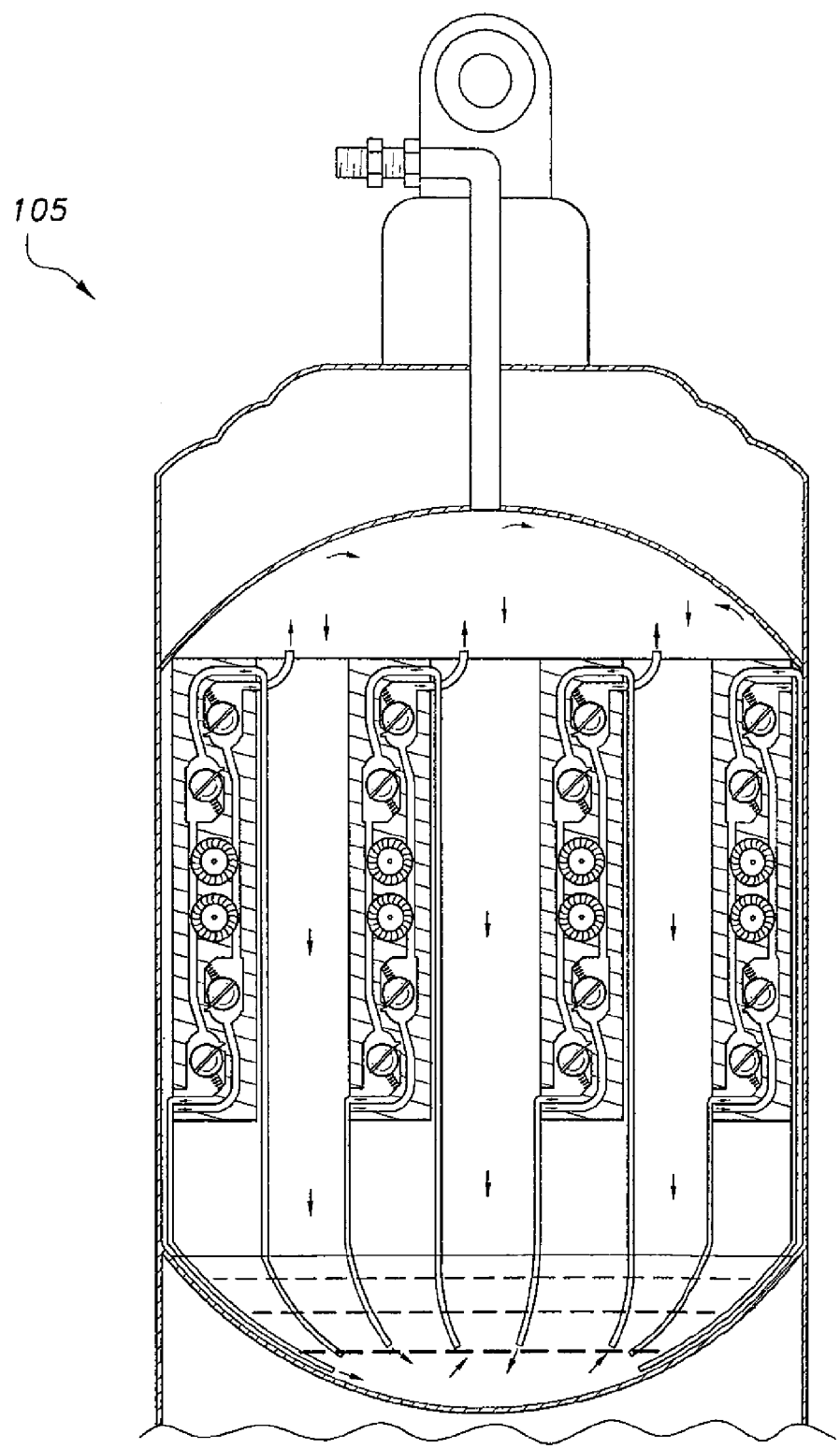
FIG. 12 is a diagrammatic section view of a shock absorber electrical generator according to the present invention.

FIG. 12 presents a diagrammatic view of operations of the shock absorber electrical generator 105. The electric energy generated by the generator may be used by the vehicle as it is generated, or stored in, for example, the vehicle's battery. Preferably, the harvested electricity is used to power components on a vehicle that would otherwise strain the internal combustion engine, thereby increasing fuel efficiency.

Figure 13:
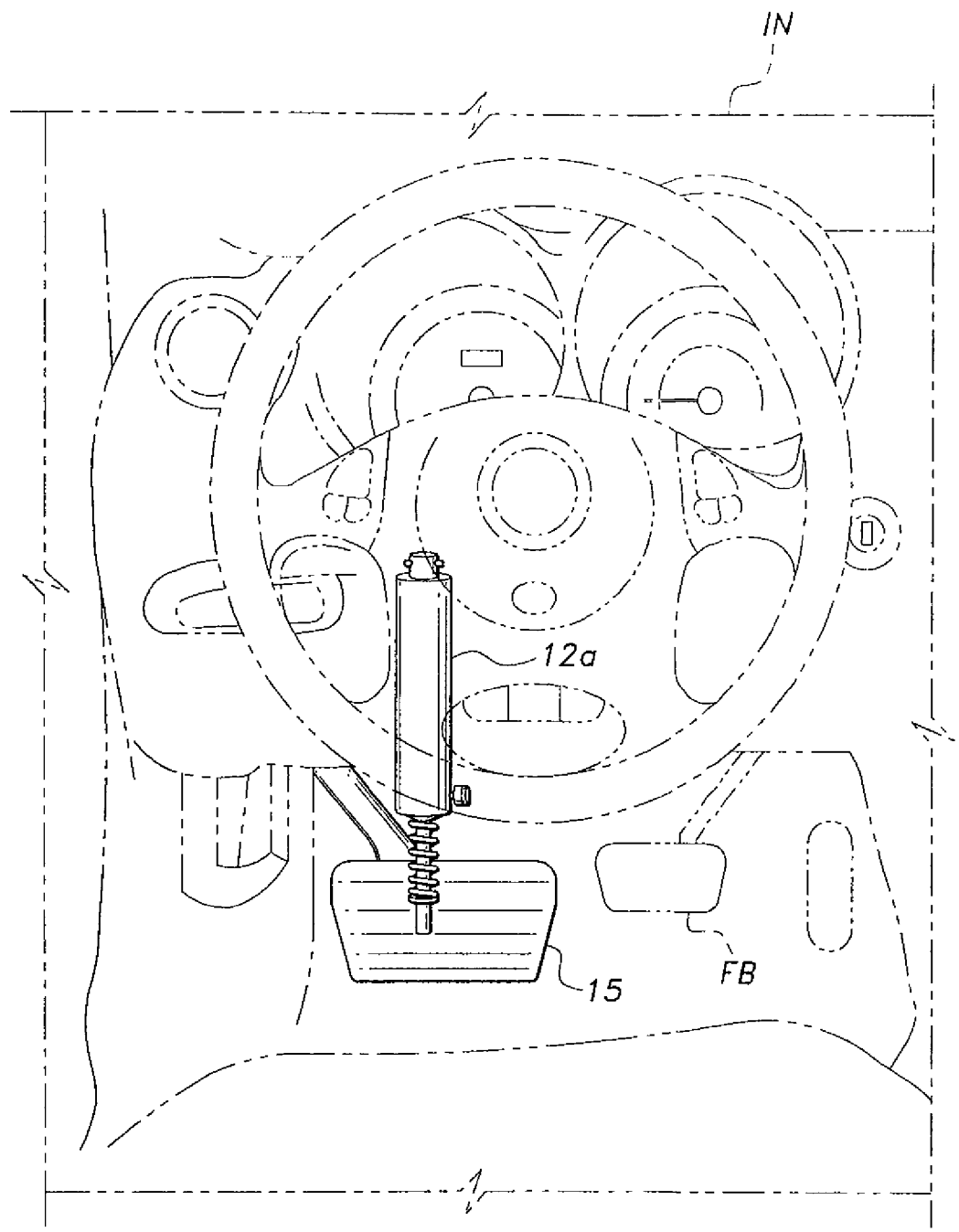
FIG. 13 is an environmental plan view of a primer pump system for the shock absorber electrical generators according to the present invention, showing deployment in a typical motor vehicle.
Figure 14:
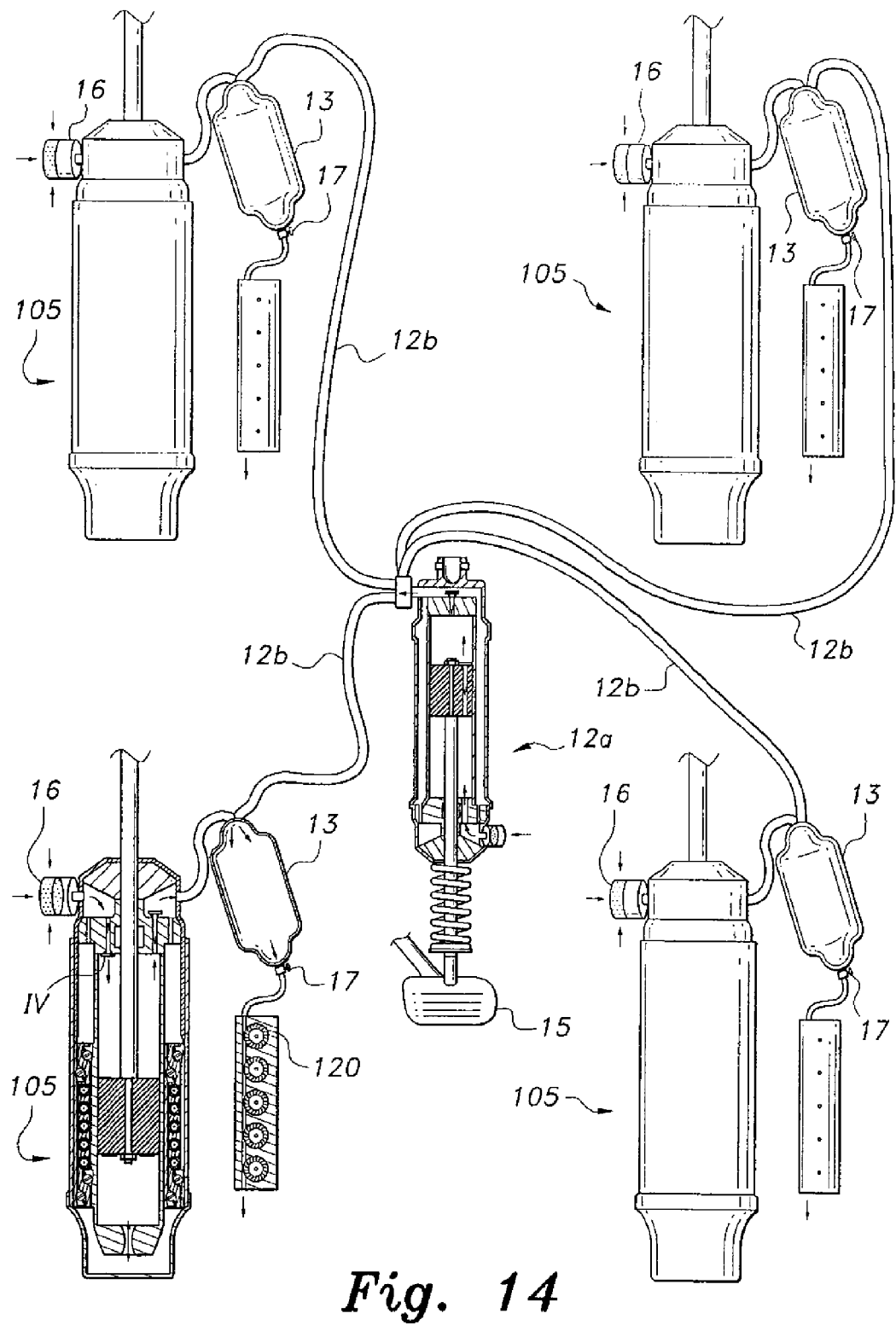
FIG. 14 is a diagrammatic front view of a system of shock absorber electrical generators according to the present invention for deployment in a typical motor vehicle having four wheels, shown with some components broken away and partially in section to show details thereof.

FIGS. 13 and 14 illustrate operations of a system of shock absorber electrical generators 105 as they would be deployed in a typical motor vehicle. As most clearly shown in FIG. 13, an air compressor manual foot pump primer 15 is disposed in the vehicle interior IN to the left of a vehicle's footbrake FB. As most clearly shown in FIG. 14, the pedal 15 engages the spring loaded primer pump 12a, which forces fresh air into the air compressor tank 13 via air tube 12b. The foot pump primer 12a starts the car's generator system if the battery or batteries are low or stolen.

The air compressor tank 13 has a pressure valve 17, which then allows compressed air into the circuit to thereby turn the generators 120. The multi-generator systems (one shock absorber 105 per vehicle wheel), fan, and housing units are deployed in a plurality of shock absorber electrical generators 105, which are attached to the vehicle wheel system. The air filter compressor intake 16 allows air to pass through the associated intake valves IV. The system works in a coordinated manner to provide electricity for the vehicle and to keep the vehicle's battery charged. Oil flows through the component parts of the shock absorber generator 105 and aids in cooling the unit 105.

It is to be understood that the present invention is not limited to the embodiment described above, but encompasses any and all embodiments within the scope of the following claims.

I claim:
1. A shock absorber electrical generator, comprising:
a substantially cylindrical, hollow shock absorber body having a first end, a second end longitudinally opposed from the first end, and a lower portion;

a hollow cap attached to the first end of the shock absorber body, the cap having a nitrogen fill valve adapted for introducing nitrogen gas into an interior portion of the shock absorber body, the cap sealing the nitrogen gas inside the shock absorber body;

a central tube internally disposed along a longitudinally central axis of the shock absorber body;

a piston assembly slidably disposed through the second end of the shock absorber body, the piston assembly including a central piston longitudinally sliding within the central tube and a larger, auxiliary piston longitudinally sliding within the lower portion of the shock absorber body;

power transfer tubes extending longitudinally alongside the central tube, the power transfer tubes forming power transfer chambers having inlets and outlets providing a circuit adapted for one-way flow of a working gas medium therethrough;

turbine fans disposed in the power transfer tubes, the turbine fans being adapted for rotary motion responsive to one-way flow of compressed working gas medium through the power transfer tubes;

electric generators housed in the shock absorber body, the generators being attached to the turbine fans, the turbine fans rotating to actuate the electric generators, thereby producing electrical energy from sliding displacement of the piston assembly within the shock absorber body; and means for attaching the shock absorber body to a suspension and wheel assembly of a motor vehicle;

wherein a compression stroke of the piston assembly causes high pressure gas to flow unidirectionally through a first portion of the circuit, thereby causing rotation of a first portion of the turbine fans, and an expansion stroke of the piston assembly causes high pressure gas to flow unidirectionally through a second portion of the circuit, thereby causing rotation of a second portion of the turbine fans to produce electric current from motion of the piston assembly.

2. The shock absorber electrical generator according to claim 1, wherein said nitrogen fill valve extends at a substantially perpendicular angle from said shock absorber body.

3. The shock absorber electrical generator according to claim 1, further comprising a travel limiter limiting displacement of the piston assembly as the piston assembly slides longitudinally inside the shock absorber body.

4. The shock absorber electrical generator according to claim 1, further comprising liquid oil flowing through internal portions of the shock absorber body to cool, lubricate, and dampen noise of internal moving parts of the assembly.

5. The shock absorber electrical generator according to claim 1, wherein the shock absorber body is hermetically sealed, allowing the internal portion of the body to accept and retain a high-pressure gaseous working medium introduced into the body through said nitrogen fill valve.

6. The shock absorber electrical generator according to claim 1, wherein said power transfer tubes are undulating.

7. The shock absorber electrical generator according to claim 1, wherein said circuit adapted for one-way flow further comprises:

spherical one-way valves disposed in said power transfer chambers within said power transfer tubes;

seal rings separating hemispherical portions of said spherical one-way valves, the seal rings seating against opposing lateral edges formed in said power transfer tubes; and springs attaching the corresponding one-way valves inside the corresponding power transfer tubes, the springs biasing the one-way-valves to a closed position inside of said power transfer chamber.

8. The shock absorber electrical generator according to claim 1, wherein said turbine fans cut a toroidal-shaped volume.

9. The shock absorber electrical generator according to claim 1, wherein said turbine fans cut a spherical-shaped volume.

10. The shock absorber electrical generator according to claim 1, further comprising a plurality of cooling air vents disposed in the electrical generators housed in said shock absorber body.

11. A motor vehicle having a plurality of wheel supports and a plurality of the shock absorber electrical generators according to claim 1, each of the shock absorber electrical generators being attached to a corresponding one of the wheel supports, said plurality of shock absorber electrical generators cooperatively generating electricity responsive to road shocks encountered by the wheels supports.

12. The motor vehicle according to claim 11, further comprising:

a compressor tank operably connected to said shock absorbers;

a spring-loaded air compressor manual foot pump primer disposed in an interior of the vehicle as a foot control; and tubes extending from the primer pump, the tubes being connected to the compressor tank;

wherein forced compressed air initiated by pumping the primer pump enters said shock absorber body and starts electrical generation therein to start the vehicle when the vehicle has a dead battery.

* * * * *